US008255540B2

(12) United States Patent
Soininen et al.

(10) Patent No.: US 8,255,540 B2
(45) Date of Patent: *Aug. 28, 2012

(54) IP ROUTING OPTIMIZATION IN AN ACCESS NETWORK

(75) Inventors: Jonne Soininen, Helsinki (FI); Jaakko Rajamiemi, Helsinki (FI); Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 1160 days.

This patent is subject to a terminal disclaimer.

(21) Appl. No.: 12/045,784

(22) Filed: Mar. 11, 2008

(65) Prior Publication Data

US 2008/0151837 A1 Jun. 26, 2008

Related U.S. Application Data

(60) Division of application No. 09/940,577, filed on Aug. 29, 2001, now Pat. No. 7,356,595, which is a continuation of application No. PCT/FI00/00178, filed on Mar. 8, 2000.

(30) Foreign Application Priority Data

Mar. 9, 1999 (FI) .......................................... 990510
Jun. 2, 1999 (FI) .......................................... 991260

(51) Int. Cl.
*G06F 15/16* (2006.01)
(52) U.S. Cl. ........ 709/227; 709/202; 709/228; 709/238; 709/245
(58) Field of Classification Search .................. 709/202, 709/227, 228, 238, 245
See application file for complete search history.

(56) References Cited

U.S. PATENT DOCUMENTS 6,161,008 A * 12/2000 Lee et al. ...................... 455/415
6,195,705 B1 * 2/2001 Leung ........................... 709/245
(Continued)

FOREIGN PATENT DOCUMENTS

EP 917320 5/1999
(Continued)

OTHER PUBLICATIONS

Sawada, Hiroshi et al., "Network Architecture on IMT-200", Journal of Institute of Electronics, Information and Communication Engineers, vol. 82 (No. 2), pp. 145-152 (Feb. 25, 1999).

(Continued)

*Primary Examiner* — Liangche A Wang
(74) *Attorney, Agent, or Firm* — Harrington & Smith

(57) ABSTRACT

In an access network which supports a mobile IP protocol, a mobile station may perform several handovers between access nodes during a long session which may cause inefficient mobile IP routing. In the present invention, an access node, which is the target of a handover during an IP session, is arranged to check the preferred mobility agent in respect of the optimal routing on the mobile IP level, and if a more preferred mobility agent is available and not the same as a current mobility agent, the connection to the current mobility agent is closed, and a new connection to the preferred mobility agent of the respective access node is opened. In merit of the new connection established by the access node to the preferred mobility agent, the agent advertisement messages sent by the new mobility agent can be received by the mobile node, and thereby the mobile node is able to detect the change of the attachment point (i.e. mobility agent) and to initiate standard mobile IP registration.

27 Claims, 3 Drawing Sheets

U.S. PATENT DOCUMENTS

| | | | |
|---|---|---|---|
| 6,337,858 B1 * | 1/2002 | Petty et al. | 370/356 |
| 6,393,482 B1 * | 5/2002 | Rai et al. | 709/225 |
| 6,760,444 B1 * | 7/2004 | Leung | 380/270 |

FOREIGN PATENT DOCUMENTS

| | | |
|---|---|---|
| JP | 10243440 | 9/1998 |
| WO | 9832299 | 7/1998 |
| WO | 9843446 | 10/1998 |
| WO | 9859468 | 12/1998 |
| WO | 9934635 | 7/1999 |
| WO | 0014981 | 3/2000 |

OTHER PUBLICATIONS

Idoue, A. et al., "Study for Realizing IP Mobility Between IMT-2000 Network and FWA Based on Mobile IP," Information Processing Society of Japan, 99-MBL-8-1, vol. 99 (No. 13), pp. 1-8 (Feb. 5, 1999).

Myles, Andrew et al., "A Mobile Host Protocol Supporting Route Optimization and Authentication," IEEE Journal on Selected Areas of Communication, Special issue on "Mobile and Wireless Computing Networks," vol. 13 (No. 5), 23 pp., (Jun. 1995).

Wada et al., "Mobile Computing on Wireless Telecommunication Networks," IEEE, pp. 778-782, (1996).

Chen, Weidong et al., "Route Optimization and Location Updates for Mobile Hosts," Proceedings of the 16th ICDCS, IEEE, pp. 1-8 (1996).

Giovanardi, Alessandra et al., "Transparent Mobile IP" An Approach and Implementation, IEEE, pp. 1861-1865, (1997).

* cited by examiner

IP ROUTING OPTIMIZATION IN AN ACCESS NETWORK

CROSS-REFERENCE TO RELATED APPLICATIONS

This application is a divisional application of copending U.S. patent application Ser. No. 09/940,577, filed Aug. 29, 2001, which is a continuation of International Patent Application PCT/FI00178, filed on Mar. 8, 2000, which in turn relies for priority upon Finnish Application No. 990510, filed Mar. 9, 1999 and Finnish Application No. 991260, filed Jun. 2, 1999, the entire contents of all of which are incorporated herein by reference.

This disclosure relates to a mechanism for optimizing the routing of macro level traffic, such as Internet-type protocol traffic, in an access network, such as a radio access network.

BACKGROUND

Mobile communications system refers generally to any telecommunications system which enable wireless communication when users are moving within the service area of the system. A typical mobile communications system is a Public Land Mobile Network (PLMN). Often the mobile communications network is an access network providing a user with wireless access to external networks, hosts, or services offered by specific service providers.

The general packet radio service GPRS is a new service in the GSM system (Global System for Mobile communication). A subnetwork comprises a number of packet data service nodes SN, which in this application will be referred to as serving GPRS support nodes SGSN. Each SGSN is connected to the GSM mobile communication network (typically to a base station controller BSC or a base station BTS in a base station system) so that the SGSN can provide a packet service for mobile data terminals via several base stations, i.e. cells. The intermediate mobile communication network provides radio access and packet-switched data transmission between the SGSN and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as a radio access network RAN.

Third generation mobile systems, such as Universal Mobile Communications system (UMTS) and Future Public Land Mobile Telecommunications system (FPLMTS), later renamed as IMT-2000 (International Mobile Telecommunication 2000), are being developed. In the UMTS architecture a UMTS terrestrial radio access network, UTRAN, consists of a set of radio access networks RAN (also called radio network subsystem RNS) connected to the core network (CN). Each RAN is responsible for the resources of its set of cells. For each connection between a mobile station MS and the UTRAN, one RAN is a serving RAN. A RAN consists of a radio network controller RNC and a multiplicity of base stations BS. One core network which will use the UMTS radio access network is the GPRS.

One of the main targets in the development of mobile communication networks is to provide an IP (Internet Protocol) service with a standard IP backbone which would use a combination of different types of mobile network mobility managements in the mobile networks and Mobile IP. The basic IP concept does not support the mobility of the user: the IP addresses are assigned to network interfaces in dependence on their physical location. In fact, the first field of an IP address (the NETID) is common to all interfaces that are linked to the same Internet subnet. This scheme prevents the user (the mobile host) from keeping its address while moving over different Internet subnets, i.e. while changing the physical interface.

In order to enhance the mobility in the Internet, a Mobile IP protocol for IP version 4 have been introduced by the Internet Engineering Task Force (IETF) in the standard RFC2002. Mobile IP enables the routing of IP datagrams to mobile hosts, independently of the point of attachment in the subnetwork. The mobile IP protocol introduces the following new functional or architectural entities.

'Mobile Node MN' (also called Mobile Host MH) refers to a host that changes its point of attachment from one network or subnetwork to another. A mobile node may change its location without changing its IP address; it may continue to communicate with other Internet nodes at any location using its (constant) IP address. 'Mobile Station (MS)' is a mobile node having a radio interface to the network. A 'Tunnel' is the path followed by a datagram when it is encapsulated. In this model a datagram, while encapsulated, is routed to a known decapsulation agent, which decapsulates the datagram and then correctly delivers it to its ultimate destination. Each mobile node is connected to a home agent over a unique tunnel, identified by a tunnel identifier which is unique to a given Foreign Agent/Home Agent pair.

'Home Network' is the IP network to which a user logically belongs. Physically, it can be e.g. a local area network (LAN) connected via a router to the Internet. 'Home Address' is an address that is assigned to a mobile node for an extended period of time. It may remain unchanged regardless of where the MN is attached to the Internet. Alternatively, it could be assigned from a pool of addresses.

'Mobility Agent' is either a home agent or a foreign agent. 'Home Agent HA' is a routing entity in a mobile node's home network which tunnels packets for delivery to the mobile node when it is away from home, and maintains current location information for the mobile node. It tunnels datagrams for delivery to, and, optionally, detunnels datagrams from, a mobile node when the mobile node is away from home. 'Foreign Agent FA' refers to a routing entity in a mobile node's visited network which provides routing services for the mobile node while registered, thus allowing the mobile node to utilize its home network address. The foreign agent detunnels and delivers packets to the mobile node that were tunnelled by the mobile node's home agent. For datagrams sent by a mobile node, the foreign agent may serve as a default router for registered mobile nodes.

RFC2002 defines 'Care-of Address' (COA) as the termination point of a tunnel toward a mobile node for datagrams forwarded to the mobile node while it is away from home. The protocol can use two different types of care-of address: a "foreign agent care-of address" is an address announced by a foreign agent with which the mobile node is registered, and a "co-located care-of address" is an externally obtained local address which the mobile node has acquired in the network. An MN may have several COAs at the same time. An MN's COA is registered with its HA. The list of COAs is updated when the mobile node receives advertisements from foreign agents. If an advertisement expires, its entry or entries should be deleted from the list. One foreign agent can provide more than one COA in its advertisements. 'Mobility Binding' is the association of a home address with a care-of address, along with the remaining lifetime of that association. An MN registers its COA with its HA by sending a Registration Request. The HA replies with a Registration Reply and retains a binding for the MN.

A single generic mobility handling mechanism that allows roaming between all types of access networks would allow the user to conveniently move between fixed and mobile networks, between public and private networks as well as between PLMN's with different access technologies. Therefore, mechanisms supporting the Mobile IP functionality are also being developed in mobile communication systems, such as UMTS and GPRS.

It is desired that the Mobile IP be implemented as an overlay of the UMTS/GPRS network while maintaining backwards compatibility with present systems, assuming minimal modifications in the GPRS standards and in networks whose operators do not want to support the MIP. FIG. 1 illustrates the minimum configuration for a GPRS operator who wishes to offer the mobile IP service. The current GPRS structure is maintained, i.e. the GPRS handles the mobility within the PLMN, while the MIP allows the user to roam between other systems, such as LAN's, and UMTS without loosing an ongoing session. In FIG. 1 the foreign agents FA are located at GGSNs. All GGSNs may not have FAs. The SGSN and the GGSN may also be co-located. One FA in a PLMN is sufficient for offering the MIP service, but for capacity and efficiency reasons, more than one may be recommendable. This means that the MS must request a PDP context to be set up with a GGSN that offers FA functionality. While setting up the PDP context, the MS is informed about network parameters of the FA, e.g. care-of address.

The MS may have the same care-of address COA during a session, i.e. as long as a PDP context is activated. A very mobile MS might perform several inter-SGSN HOs during a long session which may cause inefficient routing. As an initial improvement, a streamlining procedure, with a temporary anchoring point in the GGSN, could be introduced: If the MN is not transferring data, or is possibly even in the active state while moving from one SGSN to another, a new PDP context could be setup between the new SGSN and its associated GGSN at the handover. The MN will receive a new care-of address. If the MN were transferring data, e.g. were involved in a TCP session, the MN would move from the old SGSN to the new one while keeping the PDP Context in the old (anchor) GGSN for the duration of the data transfer. Once the data transfer is terminated, the PDP Context can be moved to the GGSN associated with the new SGSN and a new care-of address can be obtained.

The problem is how to discover the movement and to find a new foreign agent FA, preferably the nearest one, when the MN is moving from one SGSN to another. The GPRS terminal (MS) is naturally aware of the change of the SGSN on the GPRS protocol level as described above but this change is transparent to the overlaying MIP protocol and the mobile node MN associated with the GPRS terminal MS.

Similar problems may be encountered in any mobility management and routing on a system level overlaying the mobility management of an access network. These various overlaying mobility managements are commonly referred to as macro mobility management herein.

SUMMARY

An object of this disclosure is to overcome or alleviate the above described problems.

The object is achieved by a method, a system and an access node which are characterized by what is recited in the attached independent claims. Alternative embodiments are disclosed in the attached dependent claims.

In the present disclosure, a support node, or more generally any access node, which is the target of a handover during a session, is arranged to check the optimal routing in respect of macro mobility management, too. For that purpose, the access node is aware of the most preferred mobility entity, normally the closest one, which should be used. A mobility entity may be any entity which provides a point of attachment on the macro mobility level, such as a mobility agent in the mobile IP-type mobility management. In a handover situation the system, preferably the access node, checks whether there is a more preferred mobility entity which should substitute for the current mobility entity of the session. If there is no preferred mobility entity for that access node, or the preferred mobility entity appears to be the same as the current mobility entity of the session, the current mobility entity is maintained. However, if there is a more preferred mobility entity for that access node and the preferred mobility entity is not the same as the current mobility entity, the connection (e.g. a PDP context) to the current mobility entity is preferably closed (released), and a new connection (e.g. PDP context) to the preferred mobility entity of the respective access node is opened. Registration in accordance with the specific macro mobility management scheme can be carried out.

In the one embodiment, the macro mobility management is mobile IP-type mobility management. A typical feature of the mobility agent in the mobile IP is that it periodically transmits agent advertisement messages to the mobile nodes in order to advertise its services. The mobile nodes use these advertisements to determine the current point of attachment to the Internet. In merit of the new connection established by the access node to the preferred mobility agent, the agent advertisement messages sent by the new mobility agent can be received by the mobile node, and thereby the mobile node is able to detect the change of the attachment point (i.e. mobility agent) and to initiate standard mobile IP registration.

Thus, an advantage of this approach is that the inventive new functionality in the access node also enables to detect the movement of a mobile node on the macro mobility level, such as the mobile IP level, and to select and change the most optimal mobility entity in each part of the network, without needing any non-standard signaling or procedure in other elements of the access network or on the macro mobility management level.

In the packet access network a mobile station which the mobile node is associated with may have two or more packet protocol (PDP) contexts open at the same time. The above described new connection should be established for any macro mobility related PDP context the mobile station may have. However, all of the PDP contexts are not necessarily related to the macro mobility management and therefore should not be involved in the change of the mobility entity. Thus, there may be need for the access node to be able to distinguish the macro mobility management dedicated PDP contexts from other active PDP contexts of the mobile station. In an embodiment, the information transferred from the old access node to the new access node is provided with an information field which indicates the different types of the PDP contexts, or at least the macro mobility management related PDP contexts. This allows the PDP context types to be distinguished, and therefore, also the macro mobility management related PDP context can be recognized and the mobility entity of the recognized PDP contexts changed by the access node.

The route optimization saves the transmission resources in the packet radio system, and possibly also makes the connection faster as the connection leg between the access node and the mobility entity is shorter.

BRIEF DESCRIPTION OF THE DRAWINGS

In the following, various details by means of preferred embodiments with reference to the accompanying drawings, in which.

DETAILED DESCRIPTION

The present invention can be applied to any communications requiring macro mobility management which overlays the mobility management of an access network. The invention suits especially well for supporting mobile IP-type mobility management in an access network. The access network may be any access network, such as a radio access network. The invention can be especially preferably used for providing a general packet radio service GPRS in the pan-European digital mobile communication system GSM (Global System for Mobile Communication) or in corresponding mobile communication systems, such as DCS1800 and PCS (Personal Communication System), or in third generation (3G) mobile systems, such as UMTS, implementing a GPRS-type packet radio. In the following, the preferred embodiments of the invention will be described by means of a GPRS packet radio network formed by the GPRS service and the 3G or GSM system without limiting the invention to this particular access system.

Figure 1:
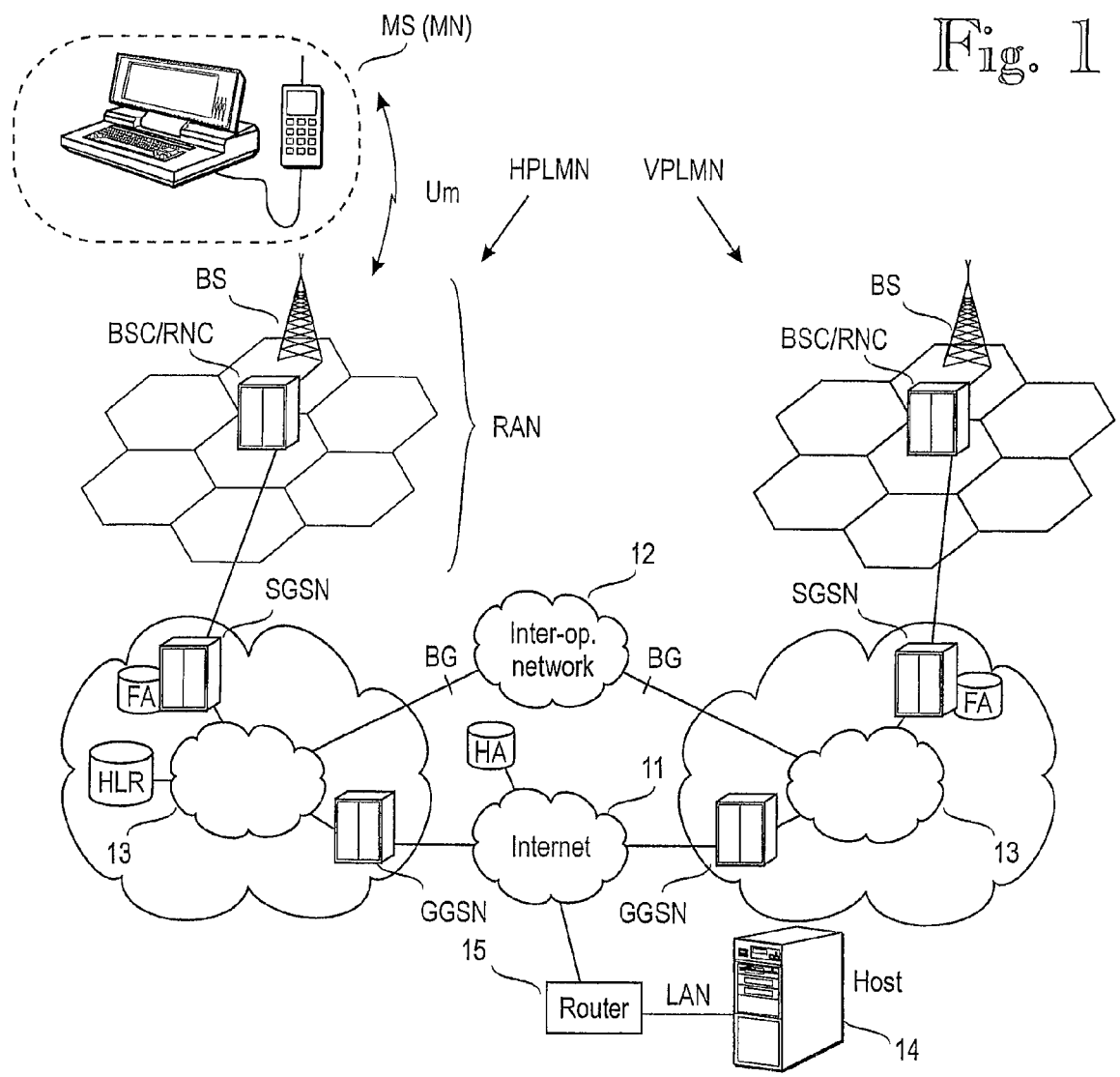
FIG. 1 illustrates GPRS network architecture.

A GPRS architecture utilizing 3G radio access (such as UMTS) or 2G radio access (such as GSM) is illustrated in FIG. 1. The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS MS, and keep a record of the location of the MSs inside of its service area. The subscription information is stored in a GPRS register (HLR) where the mapping between a mobile's identity (such as MS-ISDN or IMSI) and the PSPDN address are stored. The GPRS register acts as a database from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP network (Internet) or an X.25 network, and service centres. Fixed hosts 14 can be connected to the data network 11 e.g. by means of a local area network LAN and a router 15. A border gateway BG provides access to an inter-operator GPRS backbone network 12. The GGSN may also be connected directly to a private corporate network or a host. The GGSN includes GPRS subscribers' PDP addresses and routing information, i.e. SGSN addresses. Routing information is used for tunnelling protocol data units PDU from the data network 11 to the current switching point of the MS, i.e. to the serving SGSN. The functionalities of the SGSN and GGSN can be connected to the same physical node (SGSN+GGSN).

The home location register HLR of the GSM network contains GPRS subscriber data and routing information, and it maps the subscriber's IMSI into one or more pairs of the PDP type and PDP address. The HLR also maps each PDP type and PDP address pair into a GGSN node. The SGSN has a Gr interface to the HLR (a direct signalling connection or via an internal backbone network 13). The HLR of a roaming MS and its serving SGSN may be in different mobile communication networks.

The intra-operator backbone network 13, which interconnects an operator's SGSN and GGSN equipment, can be implemented, for example, by means of a local network, such as an IP network. It should be noted that an operator's GPRS network can also be implemented without the intra-operator backbone network, e.g. by providing all features in one computer.

Network access is the means by which a user is connected to a telecommunication network in order to use the services and/or facilities of that network. An access protocol is a defined set of procedures that enables the user to employ the services and/or facilities of the network. The SGSN, which is at the same hierarchical level as the mobile switching centre MSC, keeps track of the individual MSs' location and performs security functions and access control. GPRS security functionality is equivalent to the existing GSM security. The SGSN performs authentication and cipher setting procedures based on the same algorithms, keys, and criteria as in the existing GSM. The GPRS uses a ciphering algorithm optimised for packet data transmission.

In order to access the GPRS services, an MS will first make its presence known to the network by performing a GPRS attach. This operation establishes a logical link between the MS and the SGSN, and makes the MS available for the SMS over the GPRS, paging via the SGSN, and notification of incoming GPRS data. More particularly, when the MS attaches to the GPRS network, i.e. in a GPRS attach procedure, the SGSN creates a mobility management context (MM context), and a logical link LLC (Logical Link Control) is established between the MS and the SGSN in a protocol layer. MM contexts are stored in the SGSN and MS. The MM context of the SGSN may contain subscriber data, such as the subscriber's IMSI, TLLI and location and routing information, etc.

In order to send and receive GPRS data, the MS will activate the packet data address that it wants to use, by requesting a PDP activation procedure. This operation makes the MS known in the corresponding GGSN, and interworking with external data networks can begin. More particularly, one or more PDP contexts are created in the MS, GGSN and SGSN, and stored in the serving SGSN in connection with the MM context. The PDP context defines different data transmission parameters, such as the PDP type (e.g. X.25 or IP), PDP address (e.g. IP address), quality of service QoS and NSAPI (Network Service Access Point Identifier). The MS activates the PDU context with a specific message, Activate PDP Context Request, in which it gives information on the TLLI, PDP type, PDP address, required QoS and NSAPI, and optionally the access point name APN. The SGSN sends a create PDP context message to the GGSN which creates the PDP context and sends it to the SGSN. The SGSN sends the PDP context to the MS in a Activate PDP Context Response message, and a virtual connection or link between the MS and the GGSN is established. As a result, the SGSN forwards all the data packets from the MS to the GGSN, and the GGSN forwards to the SGSN all data packets received form the external network and addressed to the MS. The PDP context is stored in the MS, SGSN and GGSN. When the MS roams to the area of a new SGSN, the new SGSN requests MM and PDP contexts from the old SGSN.

FIG. 1 illustrates the implementation of mobile IP in the GPRS/3G environment.

The MS can be a laptop computer PC connected to a packet radio enabled cellular telephone. Alternatively, the MS can be an integrated combination of a small computer and a packet radio telephone, similar in appearance to the Nokia Communicator 9000 series. Yet further embodiments of the MS are various pagers, remote-controllers, surveillance and/or data-acquisition devices, etc. The user of a mobile station MS subscribes to a special Mobile IP service. The subscription information is stored in the Home Location Register HLR together with the user's home IP address.

In FIG. 1 the foreign agents FA are located in (integrated into) GGSNs. Alternatively, the SGSN and the GGSN are co-located, and the FAs are located in SGSN+GGSNs. It should be noted that there may be more than one SGSN and GGSN in one network. All GGSNs may not have FAs. Each FA has an IP address in the Internet and in the operator's own private GPRS/3G backbone network. More precisely, the FA's IP address is such that IP packets destined to that address are routed in the Internet to the GGSN associated with the FA. When the MN leaves its home subnet and registers to a new FA, it can no longer be reached on the basis of its home IP address alone, but must be assigned an address belonging to the visited network, called the care-of address (COA). The care-of address positively identifies the instantaneous location of the mobile terminal and may be: 1) the IP address of the FA belonging to the visited network, or 2) an IP address acquired directly by the mobile terminal through an autoconfiguration mechanism from the local IP address space, in which case the term co-located care-of address is used. When registering to a new FA and obtaining a COA, the MN which registers with a home agent HA in its home network informs the latter of its COA. In FIG. 1 a home agent HA is located in a data network 11 which is the home network of the mobile node MN associated with the mobile station MS. A second host 14 wishing to communicate with the MN need not be aware of the fact that the MN has moved: it simply sends IP packets addressed to MN's home IP address. These packets are routed via normal IP routing to the MN's home network, there they are intercepted by the HA. The HA encapsulates each such packet in another IP packet which contains the MN's COA as these packets are thus delivered to the FA (a process called tunnelling). The FA forwards the IP packet to the GGSN. The GGSN forwards the IP packet (which may be encapsulated for transmission over the GPRS backbone) to the serving SGSN which further forwards the IP packet to the MS/MN. Packets from the MN to the other host 14 need not necessarily be tunneled: the MN may simply send them to the GGSN which directly forwards the packets to the second host 14, without interception by the FA or the HA.

As noted above, according to the present invention the SGSN determines whether it is preferable to change the mobility agent of the IP session or not. A preferred embodiment of the invention will be now described with reference to FIGS. 1, 2, 3 and 4.

A reference is now made to FIG. 1. The home network of the mobile station MS is the GPRS/3G network 1. The user of the mobile station MS subscribes to a special mobile IP service, and an IP application in the MS or in a separate data terminal is a mobile node MN in a mobile IP communication. It is assumed that the MS/MN is attached to the home network 1 and the radio access network RAN1 (PS1 and PSC/RNC1). A serving support node in the home network is SGSN1. MM and PDP contexts have been created for the mobile IP service as described above, and a virtual connection is provided between the MS/MN and the SGSN1 as well as between the SGSN1 and a gateway node GGSN1 which has an associated foreign agent FA1. Thus, the IP packets addressed to the MN can be forwarded to the MN over the home network 1 and RAN1. The COA of the MN has been registered to the home agent HA in the home network 11 of the MN, so that mobile IP tunnelling is provided from the HA to the GGSN/FA1.

Figure 2:
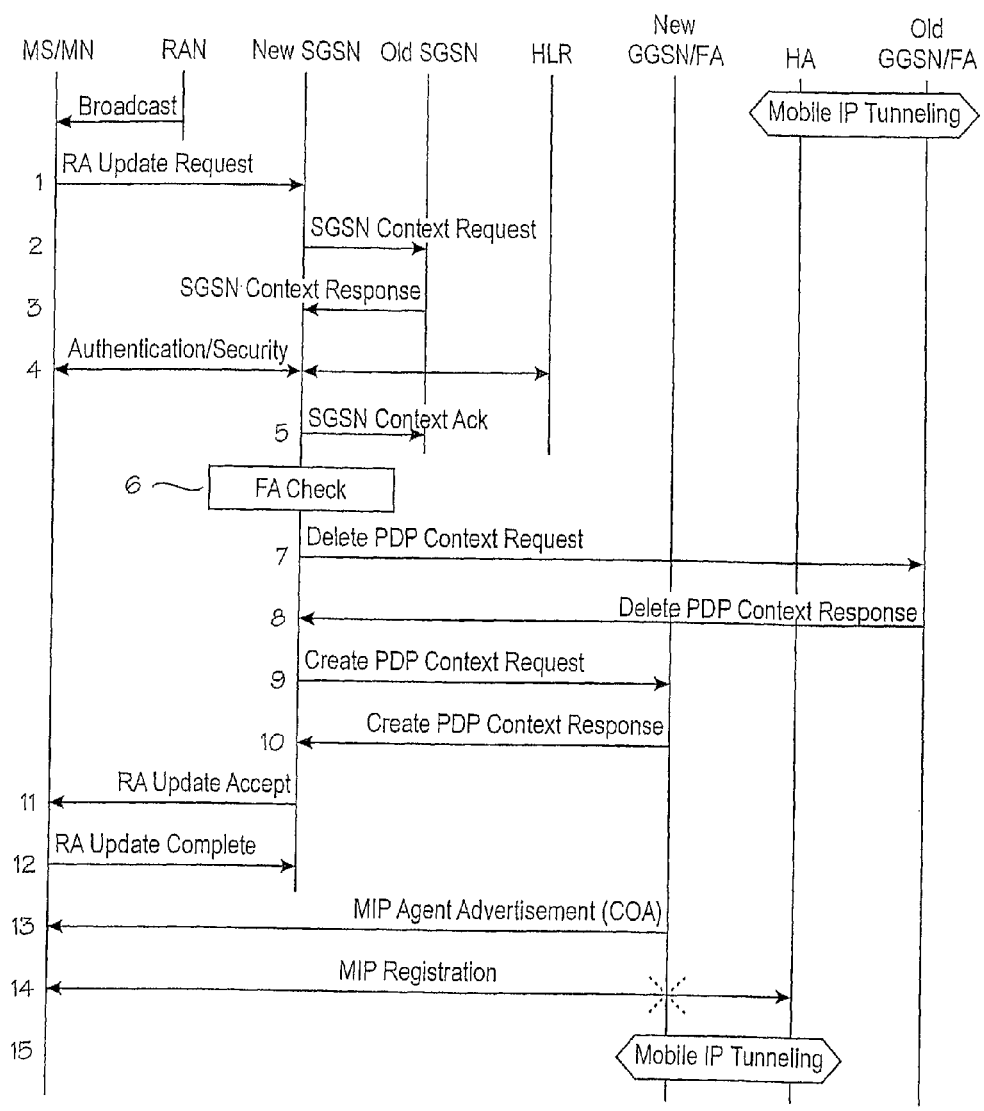
FIG. 2 is a signalling diagram illustrating the method according to the invention.

Let us now assume that the MS/MN moves to the service area of another GPRS/3G network 2 which is served by support node SGSN2. When the MS/MN arrives at a new RAN2, the MS part listens to radio broadcast messages, which contain information about radio parameters, network and cell identity, etc. as well as information about available core network, service providers, service capabilities etc. On the basis of the broadcast the MS determines that the network and/or the routing area has changed. Upon detecting a change of routing area, the MS/MN sends a routing area update request to the new SGSN, namely SGSN2, as shown in FIG. 2. The new SGSN2 sends a SGSN context request message to the old SGSN1 (in step 2) to obtain the MN and PDP contexts for the MS/MN. The old SGSN1 responds with a SGSN context response message which contains the MN and PDP contexts (step 3). According to the preferred embodiment of the invention, the information transferred from the old access node to the access node may be provided with an information field which indicates the different types of the PDP contexts, or at least the Mobile IP related PDP contexts. This allows the SGSN to distinguish the Mobile IP dedicated PDP contexts from other active PDP contexts of the mobile station which should not be involved in the change of the mobility agent. There are various possible ways to implement the PDP context type information. For example, a PDP Context Information Element, which is carried in the SGSN Context Response message in the GPRS (and in the forward SNRC relocation message in the UMTS) may be provided with a field indicating the type of service used over the PDP context. The type field may contain an access Point Name which has a value indicating a Mobile IP PDP context. Spare bits in the PDP Context Information Element may be used for the new field, or alternatively the new field may be an extension of the current PDP Context Information Element format. It should be noted, however, that the exact implementation is not relevant to the invention. It is only relevant, in this specific embodiment, that the information received from the old SGSN enables the new SGSN to determine which one(s) of the PDP contexts is (are) dedicated to the Mobile IP.

Figure 3:
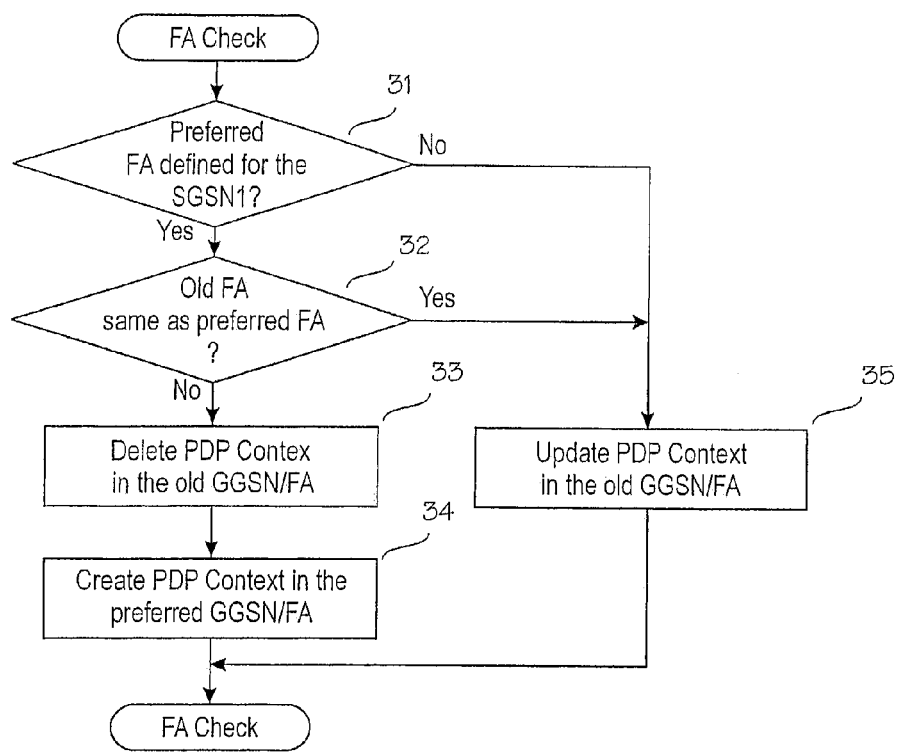
FIG. 3 is a flow diagram illustrating the function of the support node.

In step 4 the new SGSN2 may, in certain situations, execute authentication/security functions which may involve an interrogation to the HLR of the MS/MN. If the user has at least one activated PDP context, the new SGSN2 sends a SGSN context acknowledge message to the old SGSN1. The old SGSN1 may now start forwarding of buffered data packets belonging to the activated PDP context, if any, to the new SGSN2. The new SGSN2 will now execute the foreign agent check procedure according to the present invention, step 6, if there is at least one PDP context for the Mobile IP. The FA check procedure according to the preferred embodiment of the present invention is illustrated in FIG. 3. In step 31 the new SGSN2 checks whether there is a preferred FA defined for it. For example, the SGSN2 may check whether there is an address of a preferred FA2 stored in the SGSN2. In this example, the address of the GGSN/FA2 is found, and the procedure proceeds to step 32. In step 32 the new SGSN2 checks whether the address of the old FA1 obtained in the PDP context from the old SGSN1 is the same as the stored address of the preferred FA2. In this example, the old FA1 is in the GGSN1 and the preferred FA2 of the SGSN2 is in the GGSN2, and the addresses do not match. The procedure proceeds to the step 33 in which the new SGSN2 deletes the PDP context in the old GGSN/FA1 by sending a delete PDP context requests to the old GGSN/FA1, as shown in FIG. 2. As a result, any active PDP context in the GGSN/FA1 is deactivated, and the GGSN/FA1 acknowledges by sending a delete PDP context response to the new SGSN2 (step 8 in FIG. 2). Referring again to FIG. 3, the process proceeds to step 34 wherein the new SGSN2 creates a PDP context in the preferred GGSN/FA2 by sending a create PDP context requests to the new GGSN/FA2 (step 9 in FIG. 2). The GGSN/FA2 creates the PDP context for the MS/MN and returns a create PDP context response to the new SGSN2 (step 10 in FIG. 2). The new SGSN2 establishes MN and PDP contexts for the MS/MN, and responds to the MS/MN with routing area update accept message (step 11). The MS/MN acknowledges with a routing area update complete message (step 12). A virtual connection has thus been established between the MS/MN and the GGSN/FA2.

All the previous procedures have been executed in the GPRS/3G layer only. The overlaying mobile IP layer and thereby the MN part of the MS/MN are not aware of the change of the FA. However, due to the newly established connection to the GGSN/FA2 the MN is able to hear the agent advertisement messages broadcast by the new FA2 in accordance with the mobile IP protocol. Upon receiving the agent advertisement from the new FA2, the MN is able to detect a change in the point of attachment, i.e. change of FA, in accordance with the MIP standard. The agent advertisement message may also include the care-of-address COA, or the MN may acquire the COA in accordance with the MIP standard. Then the mobile node MN registers its COA with its home agent HA in accordance with the MIP standard (step 14 in FIG. 2). Depending on its method of attachment, the MN will register either directly with its HA, or through the new FA which forwards the registration to the HA. Thereafter, the mobile IP tunnelling between the HA and the old GGSN/FA1 is released and new mobile IP tunnelling is established between the HA and the new GGSN/FA2, in accordance with the mobile procedures (step 15 in FIG. 2).

As a result, the change of FA has been detected and established using standard GPRS/3G procedures and messages and standard mobile IP procedures and messages everywhere else but in the SGSN2. Also in the SGSN2 only minor modifications are needed. Firstly, a preferred FA has to be defined for the SGSN2. Secondly, the need for an FA change needs to be executed. Thirdly, the new SGSN is arranged to automatically and independently (without involvement of the MS) delete the PDP context in the old GGSN and to create a new PDP context in the new GGSN.

Figure 4:
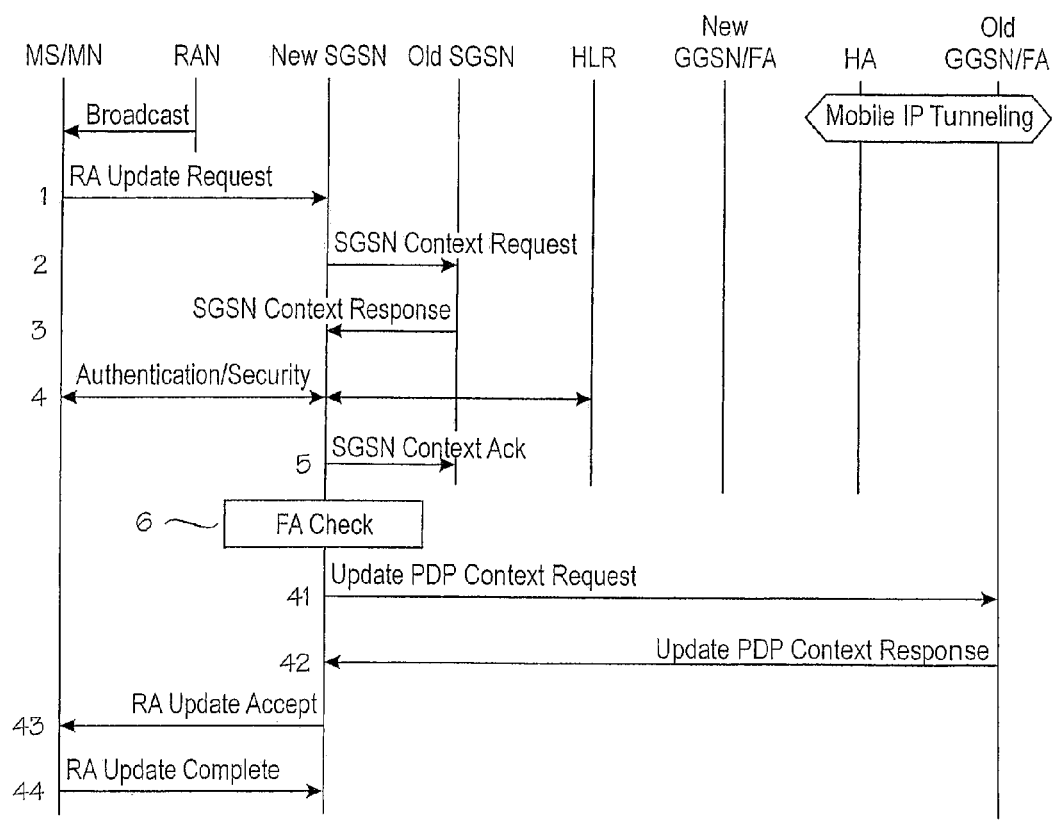
FIG. 4 is a signalling diagram illustrating the method according to the invention.

Referring again to FIG. 3, if no preferred FA is defined for the SGSN1 in step 31, or the old FA is the same as the preferred FA (the addresses match) in step 32, the process proceeds to step 35. In step 35 the new SGSN1 updates the PDP context in the old GGSN/FA1, as shown in step 41 in FIG. 4. The old GGSN/FA1 updates the PDP context to contain the address of the new SGSN2, and sends an update PDP context response to the new SGSN2 in step 42. Then the new SGSN2 sends the RA update accept message to the MS/MN (step 43) and the MS/MN responds with the RA update complete message (step 44). A virtual connection is thus established between the MS/MN and the old GGSN/FA via the new SGSN1. As the FA and the COA are unchanged, no registration to the HA is needed. In FIG. 4 steps 1 to 6 are similar to those in FIG. 2.

The description only illustrates preferred embodiments of this disclosure. The invention is not, however, limited to these examples, but it may vary within the scope and spirit of the appended claims.

What is claimed is:

1. A method comprising:
    establishing, in a first part of a radio access system, a session between one of a plurality of mobile nodes and a second party via a first access node and a first mobility entity, wherein said first mobility entity is associated with a gateway node of at least two gateway nodes, and wherein said first access node and a second access node are associated with said plurality of mobile nodes within said first part and a second part of the access system;
    rerouting the session via said second access node in response to a movement of said one of said plurality of mobile nodes to said second part of the access system;
    storing, in said second access node, an identity of a preferred mobility entity of said second access node;
    checking, in said second access node, in response to a movement of said one mobile node from said first access node to said second access node, whether an identity of said first mobility entity and said stored identity of said preferred mobility entity match or not; and
    in response to said checking:
        maintaining a connection from said second access node to said first mobility entity if the identities match, and
        closing a connection from said second access node to said first mobility entity and opening a new connection to said preferred mobility entity if said identities do not match, and initiating macro mobility management registration.

2. The method according to claim 1, wherein said closing and opening of the connection comprise closing and opening of one or more packet protocol contexts.

3. The method according to claim 2, comprising:
    transferring the packet protocol contexts of a mobile station which the mobile node is associated with from the first access node to the second access node, along with information which indicates which one or ones of the packet radio protocol contexts relate to the macro mobility management;
    distinguishing the macro mobility management related packet protocol contexts from other packet protocol contexts on the basis of said information at the second access node; and
    performing said opening and closing solely on the macro mobility management related packet protocol contexts.

4. The method according to claim 1, wherein said preferred mobility entity of said second access node is a foreign agent associated with a gateway node, of the at least two gateway nodes, in said second part of the access system.

5. The method according to claim 1, wherein said identity comprises an address of the mobility entity.

6. An access system, comprising:
a plurality of mobile nodes;
a first and a second access node serving said mobile nodes within a first and second parts of the access system, respectively;
at least one first gateway node, of at least two gateway nodes, for interfacing said first part of the access system with external networks;
a first mobility entity which is associated with said at least one first gateway node and arranged to route a connection to any one of said mobile nodes while said any one of said mobile nodes is registered to the first part of the access system;
a rerouting mechanism by which said connection initially routed via said first access node and said first mobility entity can be rerouted via said second access node in response to a movement of said any one of said mobile nodes to said second part of the access system;
a mechanism which checks whether there is a second mobility entity which is more preferred in respect of routing than said first mobility entity; and
a mechanism which opens a new connection from said second access node to said second mobility entity if said more preferred second mobility entity is available according to said checking, said any one of said mobile nodes comprising a mechanism which detects a change of attachment by means of said new connection and to initiate macro mobility management registration.

7. The system according to claim 6, comprising a mechanism which closes a connection to said first mobility entity when said more preferred second mobility entity is available according to said checking.

8. The system according to claim 6, comprising said macro mobility management being an internet protocol type mobility management, said second mobility entity being arranged to send an entity advertisement message to said one mobile node over said new connection, said mobile node being arranged to detect a change of attachment by means of said entity advertising message and to initiate mobile internet protocol registration.

9. The system according to claim 6, wherein said preferred mobility entity of said second access node comprises a foreign agent associated with a gateway node, of said at least two gateway nodes, in said second part of the access system.

10. The system according to claim 6, wherein said second access node is arranged to conduct said checking.

11. The system according to claim 10, wherein the second access node is arranged to store the identity comprising an address of the preferred foreign agent for the checking purposes.

12. The system according to claim 6, wherein said closing and opening of the connection comprise closing a packet protocol context in the gateway node of the first mobility entity and opening a packet protocol context in the gateway node of the preferred mobility entity.

13. The system according to claim 12, wherein said maintaining of the connection comprises updating of a packet protocol context of the mobile node in the gateway node of the first mobility entity.

14. The system according to claim 12, wherein packet protocol contexts of a mobile station which the mobile node is associated with are associated with information which indicates which one or ones of the packet protocol contexts relate to the macro mobility management, and wherein the access node is arranged to distinguish the macro mobility management related packet protocol contexts from possible other packet protocol contexts on the basis of said information and to perform said opening and closing solely with the macro mobility management related packet protocol contexts.

15. The system according to claim 14, wherein said information is provided in a message transferring the packet protocol contexts from said other access node to said access node.

16. An apparatus comprising:
means for storing, with an access node of two or more access nodes, an identity comprising an address of a preferred mobility entity of at least two mobility entities associated with said access node;
means for checking, in response to a movement of a mobile node of the mobile nodes from another access node of the two or more access nodes to said access node whether an identity of a first mobility entity used by said other access node and said stored identity of said preferred mobility entity match or not; and
means for opening a new connection to said preferred other mobility entity, if said preferred mobility entity is available.

17. The apparatus of claim 16, wherein said means for storing the identity comprises a memory which stores said identity, wherein said identity comprises an address, of said preferred mobile entity of said access node, and wherein said means for checking comprises a mechanism which checks, in response to a movement of said mobile node from another access node to said access node whether the identity of said first mobility entity used by said other access node and said stored identity of said preferred mobility entity match or not, said apparatus further comprising:
means for maintaining a connection to said first mobility entity if the identities match; and
means for closing the connection to said first mobility entity and opening new connection to said preferred mobility entity if said identities do not match.

18. An apparatus comprising:
means for checking, with an access node of two or more access nodes of an access system, when a mobile node having a connection through another access node and a first mobility entity of at least two mobility entities is accessing the access system via said access node, whether there is another mobility entity of the at least two mobility entities which is more preferred in respect of routing than said first mobility entity, wherein said at least two mobility entities are associated with different ones of at least two gateway nodes;
means responsive to said checking means for opening a new connection to said preferred other mobility entity if said more preferred other mobility entity is available; and
means for closing a connection to said first mobility entity when said more preferred other mobility entity is available; wherein said means for closing and opening of the connection comprise means for closing a packet protocol context in a gateway node, of at least two gateway nodes, associated with the first mobility entity and opening a packet protocol context in the gateway node of the preferred mobility entity.

19. The apparatus according to claim 18, further comprising means for maintaining the connection, the means for maintaining comprise means for updating a packet protocol context of the mobile node in the gateway node of the first mobility entity.

20. The apparatus according to claim 18, wherein packet protocol contexts of a mobile station which the mobile node is associated with are associated with information which indicates which one or ones of the packet protocol contexts relate to macro mobility management, and further comprising means for distinguishing the macro mobility management related packet protocol contexts from possible other packet protocol contexts based on said information and to perform said steps of opening and closing solely on the macro mobility management related packet protocol contexts.

21. The apparatus according to claim 20, wherein said information is provided in a message transferring the packet protocol contexts from said other access node to said access node.

22. The apparatus according to claim 18, wherein said macro mobility management comprises internet protocol type mobility management.

23. An apparatus comprising:
a processor; and
a memory including computer program code, where the memory and the computer program code are configured, with the processor, to cause the apparatus to at least:
store, with an access node of two or more access nodes of an access system, an identity, such as an address, of a preferred mobility entity of at least two mobility entities associated with said access node, wherein the at least two mobility entities are associated with different ones of at least two gateway nodes;
check, in response to a movement of a mobile node of said plurality of mobile nodes from another access node to said access node whether the identity of a first mobility entity used by said other access node and said stored identity of said preferred mobility entity match or not;
maintain a connection to said first mobility entity if the identities match, by maintaining a packet protocol context in a gateway node, of the at least two gateway nodes, associated with the first mobility entity; and
a mechanism which closes the connection to said first mobility entity by closing a packet protocol context in the gateway node associated with the first mobility entity, and opens a new connection to said preferred mobility entity by opening a packet protocol context in a gateway node, of said at least two gateway nodes, associated with the preferred mobility entity, if said identities do not match.

24. An apparatus comprising:
a processor; and
a memory including computer program code, where the memory and the computer program code are configured, with the processor, to cause the access node to at least:
store, with an access node of two or more access nodes of an access system, information of a preferred one of at least two mobility entities for said access node;
check, in response to a movement of said mobile node from another access node of said two or more access nodes to said access node whether a first mobility entity, of said at least two mobility entities, used by another access node corresponds to said preferred mobility entity according to said stored information wherein the least two mobility entities are associated with different ones of at least two gateway nodes;
maintain a connection to said first mobility entity if said first mobility entity corresponds to said preferred mobility entity according to said stored information, by maintaining a packet protocol context providing a connection from the access node to the first mobility entity; and
close the connection to said first mobility entity by closing a packet protocol context providing a connection to the first mobility entity, and open a new packet protocol context providing a new connection to said preferred mobility entity, if said first mobility entity does not correspond to said preferred mobility entity according to said stored information.

25. An apparatus according to claim 24, wherein the packet protocol context of the mobile node is associated with information which indicates which one or ones of the packet protocol contexts relate to macro mobility management associated with a gateway node of the at least two gateway nodes, and wherein the memory including the computer code is configured, with the processor, to cause the apparatus to distinguish a macro-mobility-management-related packet protocol context from possible other packet protocol contexts on the basis of said information, said apparatus being enabled only for the macro-mobility-management-related packet protocol context.

26. An apparatus comprising:
a processor; and
a memory including computer program code, where the memory and the computer program code are configured, with the processor, to cause the apparatus to at least:
store, with an access node of two or more access nodes of an access system, information on a preferred one of at least two foreign agents for said access node;
check, in response to a movement of mobile node from another access node of said two or more access nodes to said access node whether a first foreign agent used by said other access node corresponds to said preferred mobility entity according to said stored information, wherein the least two mobility entities are associated with different ones of said at least two gateway nodes;
maintain a connection to said first mobility entity if said first foreign agent corresponds to said preferred foreign agent according to said stored information, by maintaining a packet protocol context providing a connection from the access node to the first foreign agent; and
close the connection to said first foreign agent by closing a packet protocol context providing a connection to the first foreign agent, and open a new packet protocol context providing a new connection to said preferred foreign agent, if said first foreign agent does not correspond to said preferred foreign agent according to said stored information.

27. An apparatus comprising:
a processor; and
a memory including computer program code, where the memory and the computer program code are configured, with the processor, to cause the apparatus to at least:
store, with a packet radio support node, information on a preferred one of at least two foreign agents for said packet radio support node;
check, in response to a movement of said mobile node from another packet radio support node to said packet radio support node whether a first foreign agent used by said other packet radio support node corresponds to said preferred foreign agent according to said stored information;
maintain a connection to said first foreign agent if said first foreign agent corresponds to said preferred foreign agent according to said stored information, by maintaining a packet protocol context providing a connection from the packet radio support node to the first foreign agent; and
close the connection to said first foreign agent by closing a packet protocol context providing a connection to the first foreign agent, and open a new packet protocol context providing a new connection to said preferred foreign agent, if said first foreign agent does not correspond to said preferred foreign agent according to said stored information.

* * * * *